April 7, 1942.   H. A. DOUGLAS   2,278,840
ELECTRICAL CONTROL APPARATUS
Original Filed July 8, 1935   2 Sheets-Sheet 1
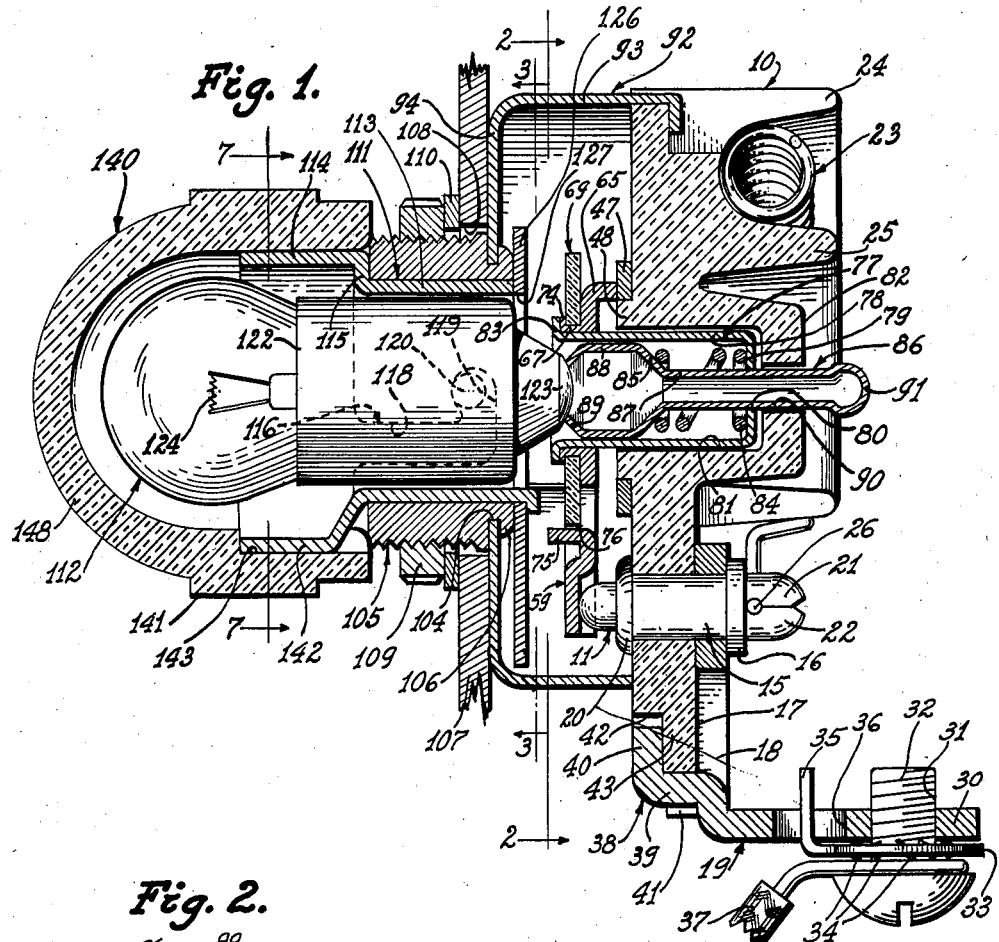
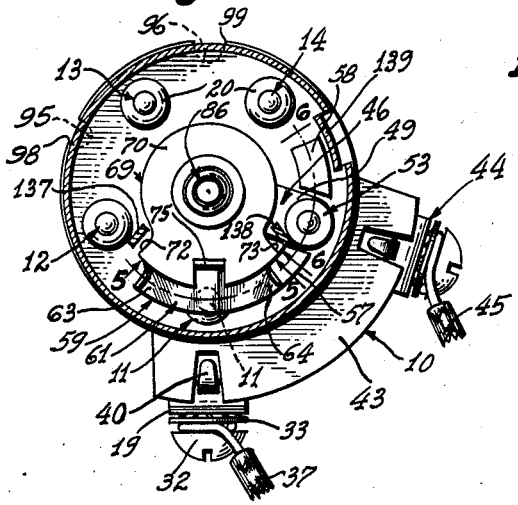
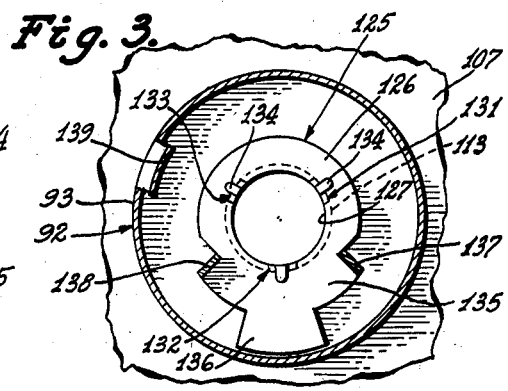
Harry A. Douglas INVENTOR.
BY
Charles S. Penfold   ATTORNEY.

April 7, 1942.  H. A. DOUGLAS  2,278,840
ELECTRICAL CONTROL APPARATUS
Original Filed July 8, 1935  2 Sheets-Sheet 2
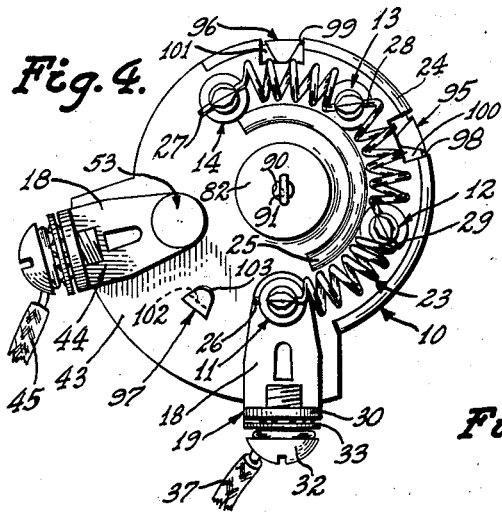
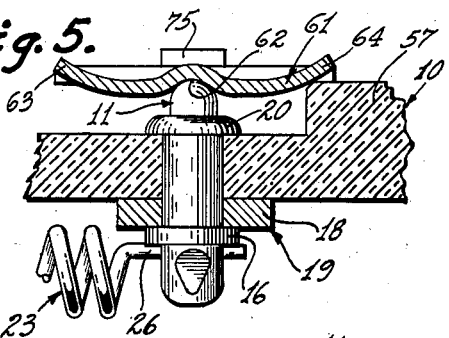
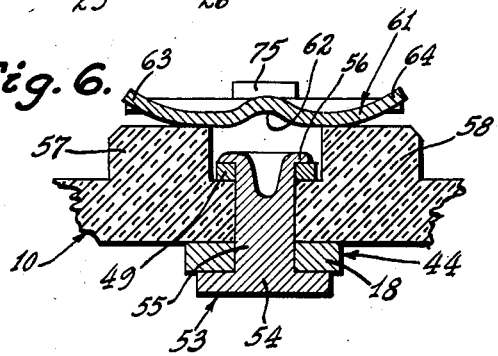
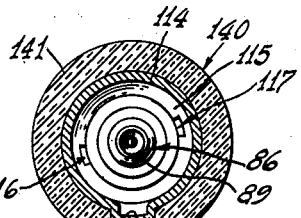
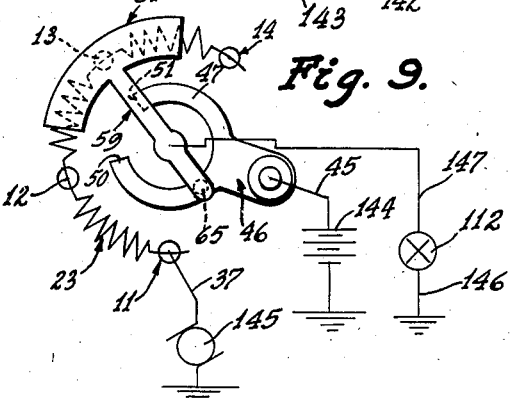
Harry A. Douglas INVENTOR.
BY
Charles S. Penfold  ATTORNEY.

Patented Apr. 7, 1942

2,278,840

UNITED STATES PATENT OFFICE 2,278,840

ELECTRICAL CONTROL APPARATUS

Harry A. Douglas, Bronson, Mich., assignor to Kingston Products Corporation, a corporation of Indiana Substituted for abandoned application Serial No. 30,277, July 8, 1935. This application November 20, 1939, Serial No. 305,376

3 Claims. (Cl. 177—311)

My invention relates to electrical control apparatus, and more particularly to electrical control apparatus embodying an indicator for indicating the condition of the control apparatus. My invention may be embodied, for example, in a rheostat controlling the current supply to a motor forming a part of a heater unit for automotive vehicles, but the use of my invention is not so limited. The principal object of my invention is to provide new and improved control apparatus of these types.

This application is substituted for my application Serial Number 30,277, filed July 8, 1935.

For purposes of illustration I have shown one embodiment of my invention in the drawings accompanying and forming a part of this application, and in these drawings:

Figure 1 is a vertical sectional view of one embodiment of my invention,

Figure 2 is a section, on a smaller scale than Figure 1, taken on the line 2—2 of Figure 1, looking in the direction of the arrows, Figure 3 is a section, on a smaller scale than Figure 1, taken on the line 3—3 of Figure 1, looking in the direction of the arrows, Figure 4 is a rear elevation of the apparatus shown in Figure 1, on a smaller scale, Figure 5 is a fragmentary section, enlarged, taken on the line 5—5 of Figure 2, looking in the direction of the arrows, Figure 6 is a fragmentary section, enlarged, taken on the line 6—6 of Figure 2, looking in the direction of the arrows, with the bridge member, shown in Figure 5, added, Figure 7 is a section, on a smaller scale than Figure 1, taken on the line 7—7 of Figure 1, looking in the direction of the arrows, Figure 8 is a perspective view of details embodied in the apparatus of Figure 1, on a smaller scale, disassembled, and Figure 9 is a diagrammatic representation of electrical circuits embodying my invention, of which circuits portions of the apparatus shown in Figure 1 form a part.

Referring to the drawings, the apparatus shown comprises a base 10 of insulating material which carries disposed therethrough a plurality of contacts 11, 12, 13, 14, in this instance four in number, concyclicly arranged. Each contact 11, 12, 13, 14 is provided with a shank 15 disposed through the base 10, each shank having a collar 16 at its rear end, the collar 16 bearing against the rear face 17 of the base 10 in the case of three of the contacts (12, 13, 14) and against a portion 18 of a terminal 19 in the case of the contact 11, the shank 15 of the contact 11 passing through an aperture in the portion 18. Another collar 20 may be formed on the shank of each contact 11, 12, 13, 14 to tightly hold the contacts to the base 10, and, in the case of the contact 11, to also hold the terminal 19 to the base. The collars 20 may be formed by shearing and turning down the front ends of the contacts. The rear ends of the shanks of the contacts are split longitudinally to form furcations 21, 22, for the purpose of making connection to a resistance wire 23, here shown as made up in helical form and disposed in an arcuate trough, formed at the rear of the base 10, by a pair of concentric arcuate flanges 24, 25 integral with the insulating base 10 and extending axially away from the rear face 17 of the base. One end 26 of the resistance wire is disposed between the furcations 21, 22 at the end of the shank of the contact 11, and the other end 27 of the resistance wire is similarly disposed between the furcations 21, 22 at the end of the shank of the contact 14. Intermediate parts 28, 29 of the resistance wire are similarly disposed between the furcations 21, 22 at the rear ends of the contacts 13, 12. The furcations 21, 22 at the ends of the shanks of the contacts 11, 12, 13, 14 are pinched together to tightly hold the resistance wire where it is disposed between the respective furcations, thereby efficiently electrically connecting the respective contacts to the resistance wire and at the same time holding the resistance wire in position in the trough formed by the flanges 24, 25.

The length of the resistance wire 23 between adjacent contacts need not be the same, but as indicated on the drawings, the length may be made different by including a different number of convolutions of the resistance wire between the respective adjacent contacts.

The terminal 19 is here shown as having a portion 30 extending at right angles rearwardly from the portion 18, the rearwardly extending portion 30 being provided with a threaded aperture 31 cooperating with a screw 32. The screw 32 may be disposed through a lock washer 33, disposed between the head of the screw 32 and the rearwardly extending portion 30. The lock washer 33 is provided with serrations 34 extending radially inwardly from the margin of the aperture in the washer, and also extending axially, with respect to the washer, in a direction away from both faces of the washer. The lock washer 33 may be provided with a leg 35 extending laterally therefrom and adapted to be disposed in an aperture 36 in the rearwardly extending portion 30 of the terminal to thereby prevent rotation of the lock washer. The screw 32 in cooperation with the lock washer 33 is shown as connecting a conductor 37 to the terminal 19.

The terminal 19 may be prevented from turning about the axis of the contact 11 by means of a finger 38 struck out from the portion 18, the finger 38 having a portion 39 extending laterally of the portion 18 and a portion 40 extending substantially parallel to the portion 18. The finger 38 has its laterally extending portion 39 disposed in a recess 41 extending radially inwardly from the margin of a fan-shaped radial extension 43 on the base 10, and its free end disposed in an axially offset recess 42 extending axially rearwardly from the front face of the base 10 and in radial alinement with the radial recess 41. The finger 38 and the portion 18 thus embrace the fan-shaped extension 43 of the base 10, and the finger 38 thereby serves not only to prevent rotation of the terminal 19 about the axis of the contact 11 but also to prevent movement of the portion 18, and therefore of the terminal 19, away from the rear face 17 of the base 10.

The base 10 also carries another terminal 44, identical with the terminal 19, but the terminal 44 serves to electrically connect a conductor 45 to a jumper 46. The jumper 46 is here shown as comprising an arcuate portion 47 fitting around an annular boss 48 extending frontwardly from the front face of the base 10. The arcuate portion 47 has integral therewith a radially extending portion 49. The arcuate portion 47 does not form a complete circle, but there is a gap therein, here shown as diametrically opposite the radially extending portion 49. Between ends 50, 51 formed by the gap in the arcuate portion 47, the boss 48 has a radial extension 52 which fills the gap and is flush with the front face of the arcuate portion 47. The jumper 46 is fastened to the base by means of a rivet 53 having a head 54 and a shank 55 disposed through an aperture in the portion 18 of the terminal 44, through the base 10, and through an aperture in the radially extending portion 49 of the jumper 46. The end 56 of the shank of the rivet 53 may be spread over the front face of the radially extending portion 49 of the jumper, in any suitable manner, to tightly hold the jumper 46 and the terminal 44 to the base 10. The base is provided with a pair of generally rectangular bosses 57, 58, disposed on circumferentially opposite sides of the radially extending portion 49 of the jumper 46, concyclic with the contacts 11, 12, 13, 14 and the rivet 53. The rivet 53 and the contacts 11, 12, 13, 14 are here shown as equally spaced circumferentially.

The terminal 44 is related to the fan-shaped extension 43 of the base in a manner similar to that already described in connection with the terminal 19.

Cooperable with the contacts 11, 12, 13, 14 is a movable bridge member 59, here shown as comprising an annular portion 60 and a fan-shaped radial extension 61. The fan-shaped extension 61 is provided with a recess 62 in which the heads of the contacts 11, 12, 13, 14 respectively are adapted to be seated, as most clearly seen in Figure 5. The lateral edges 63, 64 of the fan-shaped extension 61 are bent out of the plane of the extension to form cam surfaces enabling the bridge member 59 to more readily ride up onto the contact heads as the bridge member is rotated. The fan-shaped extension 61 is made circumferentially wide enough at its radially outer end so that as the bridge member is rotated contact will be made by the bridge member with the next adjacent contact head before contact is broken between the bridge and the trailing contact head.

The movable bridge member is here shown as provided at its side diametrically opposite from the fan-shaped extension 61 with an axial projection 65, serving as a contact brush, the end of which is cooperable with the arcuate portion 47 of the jumper 46. The bridge member is provided with a central circular aperture 66 margined by an axially extending tubular extension 67 adapted to fit an aperture 68 in an insulating plate 69, having an annular portion 70 of greater diameter than the diameter of the annular portion 60 of the bridge member, and having also a fan-shaped radial extension 71 adapted to be disposed over the fan-shaped extension 61 of the bridge member. The fan-shaped extension 71 of the insulating plate 69 is of less radial extent than that of the fan-shaped extension 61 of the bridge member 59 so that, in the illustrated embodiment, the fan-shaped extension 71 of the insulating plate 69 extends radially to the turned up lateral edges 63, 64 of the fan-shaped extension 61 of the bridge member 59. The fan-shaped extension 71 of the insulating plate 69 is circumferentially wider than that portion of the fan-shaped extension 61 of the bridge member over which the fan-shaped extension 71 of the insulating plate 69 is disposed, thereby providing shoulders 72, 73 extending circumferentially beyond the lateral edges of the aforesaid portion of the fan-shaped extension on the bridge member. The insulating plate 69 is here shown as fastened to the bridge member 59 by the formation of a radially extending annular flange 74 at the end of the tubular extension 67, the radial flange 74 tightly pressing the insulating plate 69 against the bridge member 59. The insulating plate 69 may be prevented from turning with respect to the bridge member 59 by providing the bridge member 59 with a projection 75, struck up from the bridge member 59, the projection 75 being disposed in a radially inwardly extending notch 76 in the fan-shaped extension 71 of the insulating plate 69.

The bridge member 59 is adapted to be held in position by and is rotatable about or with a thimble-like member 77 having a cylindrical portion 78 and an end wall 79 closing one end of the cylindrical portion except for an aperture 80 provided in the end wall. The cylindrical portion 78 is adapted to fit slidably in a recess 81 extending into the front face of the base 10 into a boss 82 on the rear face of the base, the axis of the recess 81 being coincident with the center of the circle defining the locus of the contacts 11, 12, 13, 14. The open end of the thimble 77 is provided with a radially outwardly extending flange 83 adapted to overlie the radially outwardly extending flange 74 on the tubular extension 67 of the bridge member 59. The thimble 77 is biased toward the bottom of the recess 81 by means of a spring 84, disposed within the thimble, one end of which engages the end wall 79 of the thimble and the other end of which engages a frustro-conical portion 85 on a lock pin 86. The lock pin 86 is provided with a shank 87 of cylindrical form merging with the frustro-conical portion 85, the frustro-conical portion in turn merging with a cylindrical portion 88, which in turn merges with a frustro-conical end portion 89, open at its smaller end. The lock pin 86 is here shown as hollow and may be made of a single piece of metal. The cylindrical shank 87 of the lock pin 86 is slidably disposed through the aperture 80 in the end wall 79 of the thimble 77 and also through an aperture 90 in the boss 82 concentric with the recess 81. Movement of the lock pin 86 under the bias of the spring 84 is limited by providing the end of the shank of the lock pin with an enlargement 91, the enlargement being conveniently formed by pressing together the walls of the end of the shank, thereby flattening these walls. The enlargement 91 is sufficiently great so that it cannot pass through the aperture 90 in the boss 82. The enlargement 91 is shown in Figure 1, out of engagement with the rear face of the boss, for reasons which will appear.

The apparatus is provided with a cup-shaped casing 92 having a cylindrical wall 93 and an end wall 94. The cylindrical wall 93 is in this instance provided with three circumferentially unequally spaced tongues 95, 96, 97, two of which, 95, 96, are adapted to be disposed in radially inwardly extending notches 98, 99, at the outer periphery of the base. The ends of these tongues, 95, 96, may be clinched radially inwardly into and against the bottoms of recesses 100, 101 extending radially inwardly from the outer periphery of the base and axially from the rear of the base toward the front face of the base in alinement with the notches 98, 99, respectively. The other tongue 97 is adapted to be disposed through an aperture 102 in the fan-shaped extension 43 of the base 10, and may have its end clinched against the bottom of a recess 103 extending axially from the rear face of the base toward the front face.

The end wall 94 of the casing 92 has a central aperture 104 concentric with the axis of rotation of the bridge member 59 and through this aperture is disposed a reduced portion of an exteriorly threaded nipple 105 tightly fastened to the end wall 94 of the casing by turning radially outwardly and against the inside of the end wall 94 the end 106 of the reduced portion of the nipple which extends rearwardly beyond the end wall 94. The casing 92 may be fastened to a panel 107 (which may be the metal panel of, for example, an automotive vehicle) by disposing the threaded nipple through an aperture 108 in the panel and setting up a nut 109, on the nipple 105, against a lock washer 110 disposed between the panel and the nut, thereby bringing up the end wall 94 of the casing tightly against the rear face of the panel 107.

Rotatably disposed in the threaded nipple 105 is a rotatable member 111 serving both as a socket for an incandescent electric lamp 112 and as a portion of an actuating means for the bridge member 59. The rotatable member 111 comprises a metallic shell having a cylindrical portion 113 rotatable within the nipple 105 and of a length approximately the same as the length of the nipple from its front end to the rear end surface of that portion 106 of the nipple which extends through the end wall 94 of the casing. The rotatable member 111 also includes a cylindrical portion 114, of larger diameter, integrally joined with the smaller cylindrical portion 113 by a radially extending annular flange 115. The rear face of the flange 115 is thus adapted to engage the front end of the nipple 105. The smaller cylindrical portion 113 is provided with two bayonet slots 116, 117, each slot comprising an axially extending portion 118 having its entrance at the junction between the smaller cylindrical portion 113 and the radially extending flange 115. The axially extending portion 118 of each bayonet slot, 116, 117, merges with a circumferentially extending portion 119, providing also a bayonet seat for pins 120, 121 on a metallic shell 122 comprising part of the base of the lamp 112. The lamp base is provided with a centrally disposed contact 123 connected in the usual manner to one end of the filament 124 of the lamp, the other end of the filament 124 being connected in the usual manner to the metallic shell portion 122 of the base of the lamp.

The rotatable member 111 is held in operative position in the nipple 105 by means of an operating member 125 comprising an annular plate 126 having a central aperture 127 of the same diameter as the inside diameter of the smaller cylindrical portion 113 of the rotatable member 111. Extending radially outwardly from the margin of the central aperture, 127, in the operating member 125 are a plurality of notches 128, 129, 130, here shown as three in number, adapted to receive three complementary axially extending projections 131, 132, 133 on the smaller cylindrical portion 113 of the rotatable member. The axially extending projections 131, 132, 133 are provided with fingers 134 of reduced width which may be clinched radially outwardly over the rear face of the operating member 125, thereby tightly holding the operating member in engagement with the rotatable member 111. It will be observed, however, that clinching over of the fingers 134 does not bind the radially extending flange 115 and the operating member 125 against the respective ends of the nipple 105 for the reason that the operating member abuts the rear end edge of the smaller cylindrical portion 113 between the projections 131, 132, 133, the parts being so proportioned that after the fingers 134 are clinched over, the rotatable member 111 will still be free to rotate within the nipple 105.

The operating member 125 is provided with a first fan-shaped radial extension 135 and a second circumferentially narrower fan-shaped extension 136, in alinement with and extending radially from the first extension 135. The first fan-shaped extension, 135, is provided at its circumferentially lateral edges with two axially extending projections 137, 138 straddling the fan-shaped extension 71 on the insulating plate 69. The projections 137, 138 are here shown as having some lost motion with the lateral edges 72, 73 of the fan-shaped extension 71. The second fan-shaped extension, 136, on the operating member 125 is adapted to engage a stop 139 formed by striking inwardly a part of the cylindrical wall 93 of the casing 92, one lateral edge of the second fan-shaped extension 136 of the operating member 125 being adapted to engage one edge of the stop 139 and the other being adapted to engage the other edge of the stop, depending on which way the operating member 125 is rotated.

When the lamp 112 is inserted in the smaller cylindrical portion 113 of the rotatable member 111, with the base pins 120, 121 in cooperation with the bayonet slots 116, 117, the base contact 123 engages the frustro-conical free end portion 89 of the lock pin 86, further inserting movement causing the lock pin 86 to move rearwardly, against the bias of the pre-compressed spring 84, thereby further compressing the spring 84. When the pins 120, 121 on the lamp base are seated in the bayonet seats of the bayonet slots 116, 117, the lock pin 86 assumes the position shown in Figure 1 in which the enlargement 91 has been moved out of engagement with the rear face of the boss 82.

It now will be apparent that the spring 84 (through intermediation of the lock pin 86 and the contact 123) serves to bias the lamp base pins 120, 121 firmly into the seats of the bayonet slots 116, 117, and also, that the rotatable member 111 is thereby biased in a direction away from the base 10, and thus the rotatable member 111 in turn biases the operating member 125 against the rear end 106 of the nipple 105. Every axial lost motion in the parts is thereby taken up. Furthermore, the spring 84 (through the intermediation of the thimble 77) serves to bias the bridge member 59 toward the base 10 and therefore the brush 65 against the arcuate portion 47 of the jumper, and the portion 61 of the bridge member against the contacts 11, 12, 13, or 14, or against other parts the portion 61 may engage.

An operating knob 140 is provided for the rotatable member 111, this knob comprising a knurled cylindrical portion 141 adapted to fit over the larger cylindrical portion 114 of the rotatable member, desirably with a fairly tight fit so that the operating knob 140 will be frictionally held in engagement with the rotatable member, but also be readily removable. The knob 140 may be prevented from rotating about the rotatable member 111 by providing the larger cylindrical portion 114 of the rotatable member with a bulged out portion 142 adapted to fit in a complementary axially extending recess 143 in the inner periphery of the cylindrical portion 141 of the knob 140. The knob includes a dome-shaped portion 148 integral with the cylindrical portion 141. The knob is made of transparent or translucent, desirably insulating, material through which the light from the lamp 112 may pass.

It will be evident that by turning the knob 140 the rotatable member 111 will be turned about its axis, and, depending upon the direction of rotation, one or the other of the projections 137, 138 on the operating member 125 will engage a lateral edge 72, 73 respectively of the fan-shaped extension 71 on the insulating plate 69, thereby turning the bridge member 59 about its axis. It will be noted that in such turning movement the lamp 112 will also take part; and the lock pin 86 and the thimble 77 are free to rotate in unison with the bridge member 59 and the lamp 112. On the other hand, the nipple 105 being stationary, the operating member 125 will rotate with respect thereto, but is maintained in engagement and electrical contact with the rear end 106 of the nipple 105 by the bias of the spring 84.

When the bridge member 59 is rotated counter-clockwise, as viewed in Figure 2, the stop 139 stops the bridge member in the position shown in Figure 6, the brush 65 being then on the insulating portion 52. When the bridge member is rotated clockwise, the stop 139 stops it when the recess 62 of the bridge member is in engagement with the contact 14. The fact that the tongues 95, 96, 97 are unequally spaced circumferentially, predetermines the position of the stop 139, since the casing 92 can be assembled with the base 10 in only one rotative angular relation.

The apparatus shown in Figure 1 may be electrically connected as shown in Figure 9. In this figure the structure of the rheostat is only diagrammatically indicated, but insofar as feasible the parts corresponding to those of Figures 1 through 8 have been given the same reference numerals. The jumper 46 is shown as connected by the conductor 45 to one terminal of a battery 144, the other terminal of the battery being connected to ground. The battery 144 may be the usual battery carried by an automotive vehicle, the ground being the frame of the vehicle. The contact 11 is shown as being connected by the conductor 37 to one terminal of a motor 145, the other terminal of which is connected to ground. The motor 145 may be a motor utilized in a heater for automotive vehicles. The lamp 112 is shown as having one terminal connected to ground through a conductor 146 and the other terminal connected to the bridge member 59 by a conductor 147.

The conductors 146, 147 represent diagrammatically certain series of parts of the apparatus hereinbefore described. The manner in which one terminal of the lamp is connected by these parts to ground and the other terminal of the lamp to the bridge member 59 is as follows. The panel 107 is of course connected to the frame, that is, the ground connection, and the panel 107 is electrically connected to the nipple 105. The operating member 125 is biased into contact with the rear end 106 of the nipple, thereby efficiently electrically connecting the panel to the rotatable member 111. The shell 122 of the lamp base and the pins 120, 121 thereon are in electrical connection with the rotatable member 111. Tracing the circuit further, the circuit continues from the shell 122 of the lamp base through the filament 124 to the lamp base contact 123, through the lock pin 86, and either through the spring 84 or through the lock pin 86, or both, to the thimble 77, and from the thimble to the bridge member. When the brush 65 is in contact with the jumper 46, the circuit for the lamp 112 is completed through the brush 65, the jumper 46, the conductor 45 through the battery 144 to ground.

Referring again to Figure 9, it will be evident that in the position of the parts there shown, the battery 144 supplies current to the motor 145 through the jumper 46, through the brush 65 of the bridge member 59, through the bridge member 59 to the contact 13, thence through that portion of the resistance 23 interposed between the contacts 13 and 11 to one terminal of the motor 145, and through the motor 145 back through the ground to the other terminal of the battery 144.

On the other hand, the lamp 112 is supplied with current from the battery 144, from one terminal of the battery through the brush 65 of the bridge member 59, through the bridge member 59, and from the bridge member 59 through the lamp 112, by way of the parts already hereinbefore described, to ground and back to the other terminal of the battery 144. While the motor 145 is thus supplied with current from the battery through a part of the resistance 23, in the position of the parts as shown in Figure 9, no part of the resistance 23 is in circuit with the lamp 112, and, therefore, the lamp operates at full brilliance as determined by the full electromotive force of the battery 144 or other source of current.

It will be evident that if the bridge member is moved so that it engages the contact 14, more resistance will be inserted in the motor circuit, thus reducing the electromotive force applied to the motor 145 and therefore also reducing its speed, but the lamp 112 will still be supplied with the full electromotive force of the battery 144 through the circuit hereinbefore traced and will continue to operate at full brilliance. If the bridge member 59 is moved so as to engage the contact 12 less resistance will be inserted in the motor circuit, thereby operating the motor 145 at a higher speed, and when the bridge member 59 is moved to engage the contact 11 the full electromotive force of the battery will be supplied to the motor 145, thereby operating it at its highest speed. However, in all of these positions of the bridge member 59 the circuit for the lamp 112 is the same as already described and it continues to operate at full brilliance for all these positions of the bridge member 59.

Thus, for any and all "on" positions of the bridge member 59 the lamp 112 will be energized to the same intensity, irrespective of the amount of resistance in the circuit of the motor 145.

When the bridge member 59 is moved in a counterclockwise direction, as viewed in Figure 9, far enough so that contact is broken between the bridge member 59 and the contact 11, further counterclockwise movement of the bridge member will be stopped when the second fan-shaped extension 136 of the operating member 125 hits the stop 139. Meanwhile, the fan-shaped extension 61 of the bridge member 59 will have been moved up onto the bosses 57, 58 to the position shown in Figure 6, in which the parts are in "off" position. Contact between the bridge member 59 and the jumper 46 will be then entirely interrupted, since the bridge member 59 is kept out of contact with the rivet 53 and, also, the brush 65 has been moved off of the arcuate portion 47 of the jumper 46 onto the extension 52 of the boss 48. In this position of the parts the circuits to the motor 145 and to the lamp 112 are both interrupted, extinguishment of the lamp 112 indicating that the motor circuit has been interrupted.

From the foregoing it will be apparent to those skilled in the art that the illustrated embodiment of my invention provides a new and improved electrical control apparatus, readily and conveniently constructed and assembled, and accordingly, accomplishes at least the principal object of my invention. On the other hand, it also will be obvious to those skilled in the art that the illustrated embodiment of my invention may be variously changed and modified, or features thereof, singly or collectively, embodied in other combinations than those illustrated, without departing from the spirit of my invention, or sacrificing all of the advantages thereof, and that accordingly, the disclosure herein is illustrative only, and my invention is not limited thereto.

I claim:

1. In combination in electrical control apparatus: a switch including a movable switch member and a stationary contact; means providing a socket for an incandescent electric lamp; a carrier; thimble-shaped means carried by said carrier and having an abutment at its open end engaging said movable switch member, and having an aperture in its closed end; contact means disposed within said thimble-shaped means, having a shouldered portion, and a portion extending through the aperture in the closed end of the said thimble-shaped means; spring means interposed between said contact shoulder and the closed end of said thimble-shaped means, said spring means being constructed and arranged to bias said movable switch member toward said stationary contact, and said contact means toward the incandescent electric lamp; and means on said contact means acting to hold said thimble means to said carrier.

2. In combination in the electrical control apparatus: a switch including a movable switch member and a stationary contact; means providing a socket for an incandescent electric lamp; a carrier; thimble-shaped means carried by said carrier and having an abutment at its open end engaging said movable switch member, and having an aperture at its closed end; tubular contact means disposed within said thimble-shaped means, having a shouldered portion, and a portion extending through the aperture in the closed end of said thimble-shaped means; spring means interposed between said contact shoulder and the closed end of said thimble-shaped means, said spring means being constructed and arranged to bias said movable switch member toward said stationary contact, and said contact means toward said lamp to engage the lamp and hold same in relation to its socket; and means on said contact means located adjacent one side of said carrier for holding said thimble means assembled with said carrier.

3. In combination in electrical control apparatus: a switch including a movable switch member and a contact; means providing a socket for an electric lamp; a carrier provided with a well; thimble-shaped means disposed within said well and having an abutment adjacent its open end engaging said movable switch member, and having an aperture in its closed end; contact means disposed in said thimble-shaped means; said contact means having a head portion, and a spindle portion extending through the aperture in the closed end of the thimble-shaped means; resilient means interposed between said head portion and the closed end of said thimble-shaped means, said resilient means being constructed and arranged to bias said movable switch member toward said contact, and said contact means to engage the lamp to hold same in relation to its socket; and abutment means provided adjacent one extremity of said contact means located at one side of said carrier for holding said thimble means with respect to said carrier.

HARRY A. DOUGLAS.